Sept. 27, 1927.

C. BOWMAN

MAP CONSTRUCTION

Filed Nov. 4, 1925

1,643,831

Witness
Roy Rusher

Inventor
Clifford Bowman
by Bair & Freeman Attorneys

Patented Sept. 27, 1927.

1,643,831

UNITED STATES PATENT OFFICE.

CLIFFORD BOWMAN, OF SPENCER, IOWA.

MAP CONSTRUCTION.

Application filed November 4, 1925. Serial No. 66,796.

The object of my invention is to provide a map construction formed of a number of sections adapted to coact with each other, wherein only one or two sections of a large map need be used at one time for indicating direction of travel for tourists or of automobile travellers.

A still further object of my invention is to provide a large map formed in a number of sections, each section having coacting portions on its side and ends adapted to coact with the next adjacent section, and to further have overlapping portions, which overlapping portions have corresponding map data thereon. The corresponding data on the overlapping portions make it possible to use the map conveniently and insure proper connection between the interfitting sections.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1:
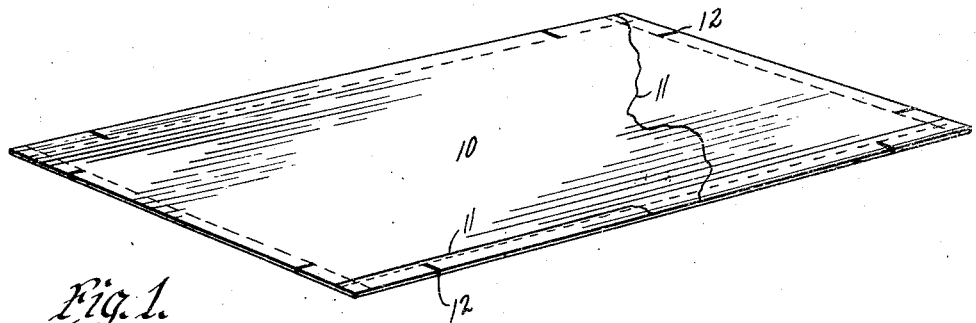
Figure 1 is a perspective view of one of the map sections.
Figure 2:
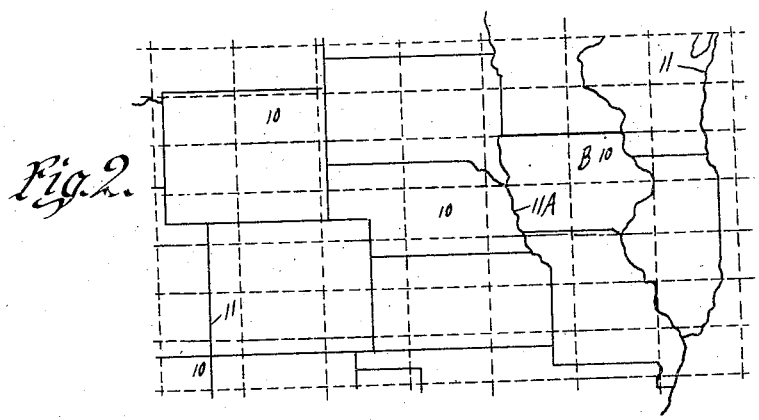
Figure 2 shows a number of map sections (dotted line) arranged to cover various States of the Union.

In the accompanying drawings, I have used the reference numeral 10 to indicate a map section which may be of any convenient size, preferably 7 x 11 inches.

The section 10 has map data 11 thereon. Each section 10 is formed of tough card board so that it will withstand the ordinary usage given a road map by an automobile tourist.

The ends and sides of each section 10 are formed with a number of notches 12, which coact with similar notches formed in the ends and sides of each other section.

Figures 3, 4:
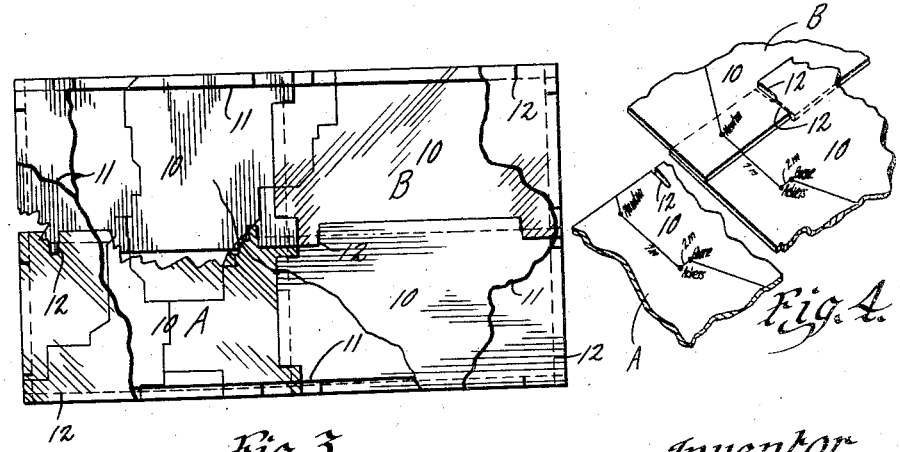
Figure 3 shows four sections interfitting each other, which sections show a substantially complete map of the State of Iowa.
Figure 4 is a detail, perspective view of coacting portions of the adjacent sections and shows further the corresponding data on the overlapping portions of the sections.

The coacting notches 12 are clearly illustrated in Figures 3 and 4 of the drawings.

The map data 11 is so arranged that when the sections 10 are connected together, as shown in Figure 3 of the drawings, the overlapping portion of the sections will have corresponding map data thereon, thus assuring proper connection between adjacent sections and enabling the traveller to use one section and know where he is, and then use another section, which will at least have as a starting point data on the portion of the section, which is being overlapped.

In order to illustrate the arrangement of the map data, I have shown in Figure 4 portions of a section connected together and a corner of a section separated.

The line of travel as indicated in Figure 4, is as follows, "Bonne to Ackers, two miles; Ackers to Newton, seven miles".

It will be noted that Newton is shown on both sections, as illustrated in Figure 4, and this enables the traveller to use the lower section referred to by reference character A, until he gets to Newton and then use the section B commencing at Newton, thus giving the traveller an overlapping portion having the same data thereon. This provision makes it possible to accurately locate one's position upon the next adjacent map and helps the tourist to get his "bearings".

By use of map sections, as the kind illustrated, I am able to furnish maps of portions only of a State, or portions of various States. For example, if a tourist decided on taking an automobile trip over the Lincoln Highway from New York city to San Francisco, he could buy only the sections covering the particular line of travel.

The sections may be packed in convenient packages.

The advantage of having a map illustrate only the line of travel desired is very great because it eliminates the necessity of having large maps showing much territory which is unnecessary so far as the tourist is concerned.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. A map construction comprising a plurality of sections, each section having printed map data thereon, said sections having notches in their sides and ends to permit two sections to interfit with each other, end to end or side to side with the bottoms of their interfitting notches engaging each other, portions of said two interfitting sections overlapping each other, said overlapping portions having identical data thereon whereby the map will be complete whether the overlapping portion of one or the other of the two interfitting sections is above or below its interfitting overlapping portion.

2. A device of the class described comprising a plurality of sections, each section having printed data thereon, means on said sections for enabling two sections to interfit with each other, end to end or side to side, said means having interfitting portions to properly position one section relative to its interfitting section, portions of said two interfitting sections overlapping each other, said overlapping portions having identical data thereon whereby the overlapping portions of either section may be above or below its interfitting overlapping portion and the data on one section will be a continuation of the data on the other section.

CLIFFORD BOWMAN.